United States Patent [19]
Fletcher

[11] Patent Number: 4,630,703
[45] Date of Patent: Dec. 23, 1986

[54] TWO-WHEELED MOTOR VEHICLE ASSEMBLY

[76] Inventor: James D. Fletcher, P.O. Box 218, Bodfish, Calif. 93205

[21] Appl. No.: 808,246

[22] Filed: Dec. 12, 1985

[51] Int. Cl.$^4$ .................. B62K 11/14; B62K 23/04
[52] U.S. Cl. .................. 180/219; 74/551.8; 180/335
[58] Field of Search .......... 180/219, 78, 335; 280/289 H; 74/551.1, 551.3, 551.8, 551.9

[56] References Cited

U.S. PATENT DOCUMENTS

| | | | |
|---|---|---|---|
| 734,742 | 7/1903 | Patrick | 74/551.8 |
| 3,336,048 | 8/1967 | Papucki | 74/551.8 X |
| 3,505,901 | 4/1970 | Stone | 74/551.4 |
| 3,937,629 | 2/1976 | Hamasaka | 74/551.9 X |
| 4,056,268 | 11/1977 | Connor et al. | 180/219 X |

FOREIGN PATENT DOCUMENTS 479565 2/1938 United Kingdom ............ 74/551.8

Primary Examiner—John A. Pekar
Attorney, Agent, or Firm—Donald E. Nist

[57] ABSTRACT

The two-wheeled vehicle assembly includes a motorcycle, motorbike or powered bicycle having a frame, a pair of wheels, one behind the other, a steering column, including a pair of handlebars and handles, a seat and a motor, and a throttle, throttle linkage as well as a throttle control, the latter connected to one of the handlebars, directly or indirectly. The assembly also includes a moveable auxiliary steering device which extends rearwardly from at least one of the handlebars or steering column, adjacent the seat and which enables the rider to lean back in a relaxed position in the seat, with his or her hands off of the handlebars and still be able to fully and precisely steer the vehicle. The auxiliary steering device can be made to pivot out of the way when desired and is individually repositionable for maximum ease and convenience. It includes an elongated arm, preferably with multiple articulated sections. It may also have a rotatable rear handle connected to the rear end of a wire throttle control extension, the front end of which is connected either to a wheel secured to a rotatable throttle control sleeve in one of the handlebars or directly to the carburetor throttle linkage. The assembly is simple, durable and efficient, permitting full steering and speed control while the rider is in a relaxed semi-reclining posture on the seat.

14 Claims, 8 Drawing Figures

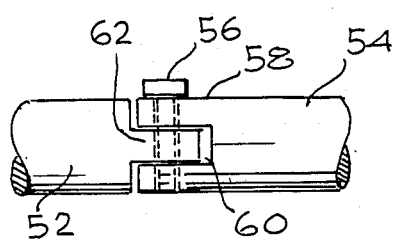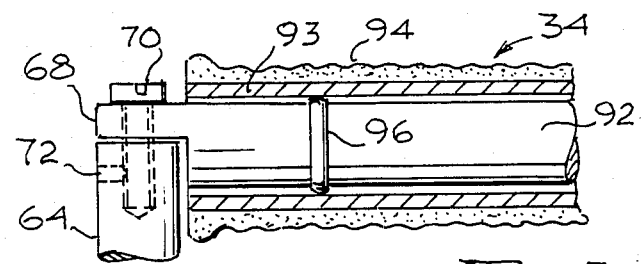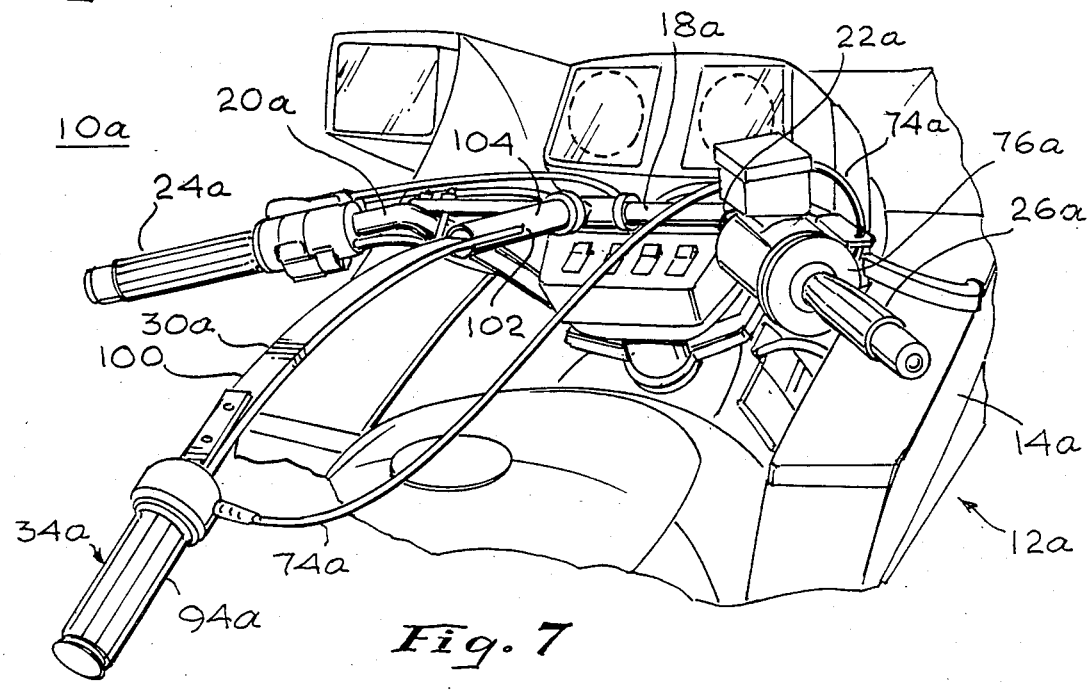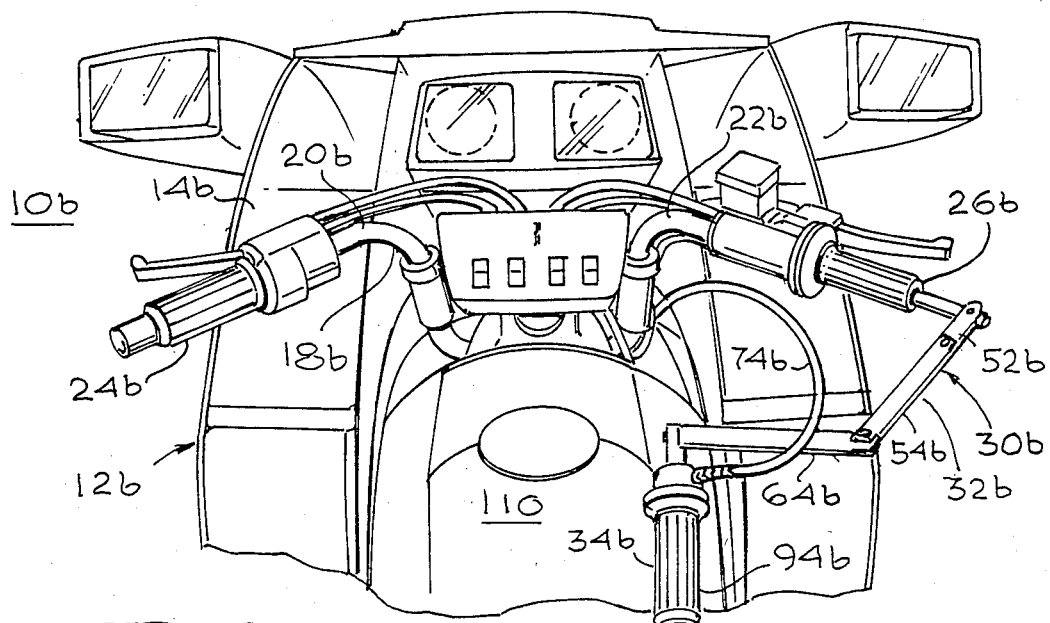

1

TWO-WHEELED MOTOR VEHICLE ASSEMBLY

BACKGROUND OF THE INVENTION

1. Field of the Invention

The present innvention generally relates to improvements in two-wheeled vehicles and more particularly to an improved motorcycle, motorbike or the like having auxiliary steering and speed controls which permit the rider to sit back on the seat away from the handlebars and still precisely control the speed and direction of the vehicle.

2. Prior Art

Motor-powered two-wheeled vehicles such as motorcycles, motorbikes and motorized bicycles generally employ a pair of handlebars which the rider grips and turns to control the direction of travel of the vehicle. One of the handlebars also usually includes a throttle control to regulate the speed of the vehicle. On long trips on the vehicle it can be very tiring to have a lean forward or sit upright or hunch over the handlebars in order to steer the vehicle. It is also very tiring to lean back in the seat and fully extend the arms in order to try and reach the handlebars for steering.

The fatigue factor is prevalent because in turning such a vehicle while traveling at substantial speed the strong natural tendency for it to continue in a straight line must be overcome. This is usually accomplished in part by leaning to the side, thereby throwing the vehicle out of balance. It will then move in the direction of the lean to regain its balance. Thus, the rider pushes on one of the handlebars, creating a slight misalignment of the front wheel fork, forcing the vehicle out of balance, thereby causing it to turn in the direction of the handlebar that has been pushed. This takes dexterity, coordination and strength and thus adds to the fatigue of the rider.

It would be desirable to be able to provide an improved system for reducing rider fatigue, particularly on long trips, while increasing the ability of the rider to sit back and relax on the seat and still precisely steer the vehicle and control its speed. Such a system should be capable of being made in a variety of forms.

SUMMARY OF THE INVENTION

The improved vehicle assembly of the present invention satisfies all the foregoing needs. Thus, the assembly is substantially as set forth in the Abstract. It includes a motorcycle, motorbike or motorized bicycle or the like motor powered two-wheeled vehicle having a frame, motor, seat and steering column including a pair of handlebars and handles, usually with a throttle connected to one handlebar. The assembly further includes a novel auxiliary steering device comprising an elongated movable arm connected to one of the handlebars, preferably that bearing the throttle. The arm extends rearwardly from the handlebars to an area adjacent the seat and is pivotable so that its position can be adjusted to collapse or move out of the way when it is not in use and during an emergency.

With the arm in use, the rider can sit back in the seat in a totally relaxed position and precisely, accurately and easily steer the vehicle. Moreover, the arm preferably bears a throttle control extension wire. The wire is preferably connected to a rear rotatable handle end of the arm, and runs forward either to the handlebar handle which bears the throttle and which is also rotatable to operate the throttle or directly to the carburator throttle linkage. Rotation of the rear arm handle causes like rotation of the handlebar handle in the first case, and movement of the throttle linkage in both cases to operate the throttle. To facilitate connection of the wire to the handlebar throttle, a wheel is preferably secured to the rotatable throttle sleeve within the handlebar handle, and the wire is then releasably secured in a groove in the wheel.

Further features of the invention are set forth in the following detailed description and accompanying drawings.

DRAWINGS

FIG. 5 is an enlarged fragmentary top plan view, partly broken away, of the rear handle of the auxiliary steering arm of FIG. 1;

FIG. 6 is an enlarged fragmentary side elevation of a connection between two articulated portions of the auxiliary steering arm of FIG. 1;

FIG. 7 is a schematic, fragmentary perspective view of a second preferred embodiment of the improved two-wheeled vehicle assembly of the present invention; and, FIG. 8 is a schematic, fragmentary perspective view of a third preferred embodiment of the improved two-wheeled vehicle assembly of the present invention.

DETAILED DESCRIPTION

FIGS. 1–6

Figure 1:
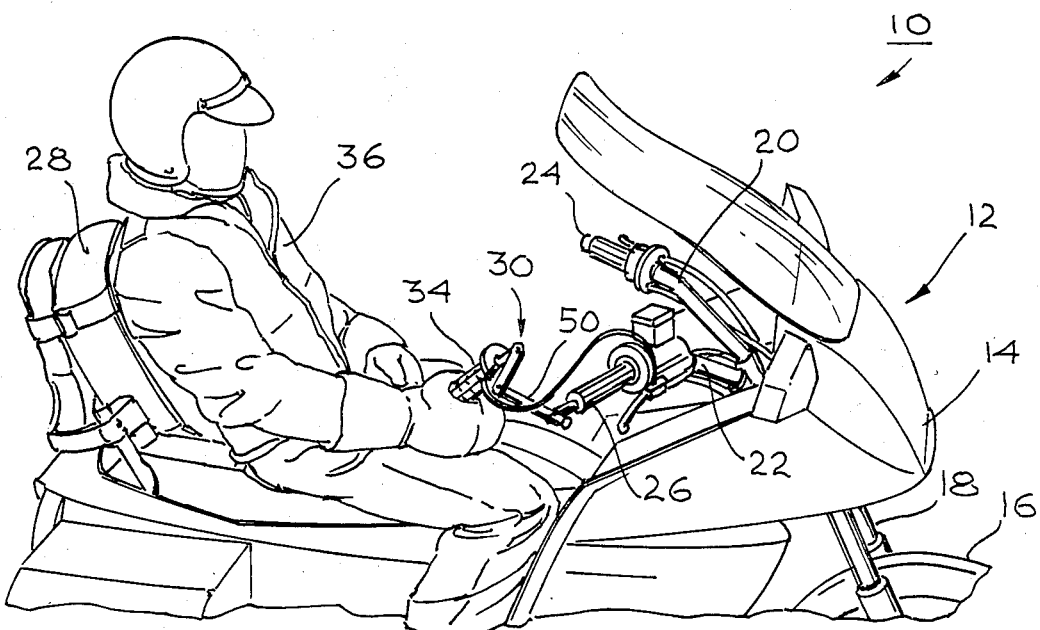
FIG. 1 is a schematic fragmentary perspective view of a first preferred embodiment of the improved motor-powered two-wheeled vehicle assembly of the present invention.
Figure 2:
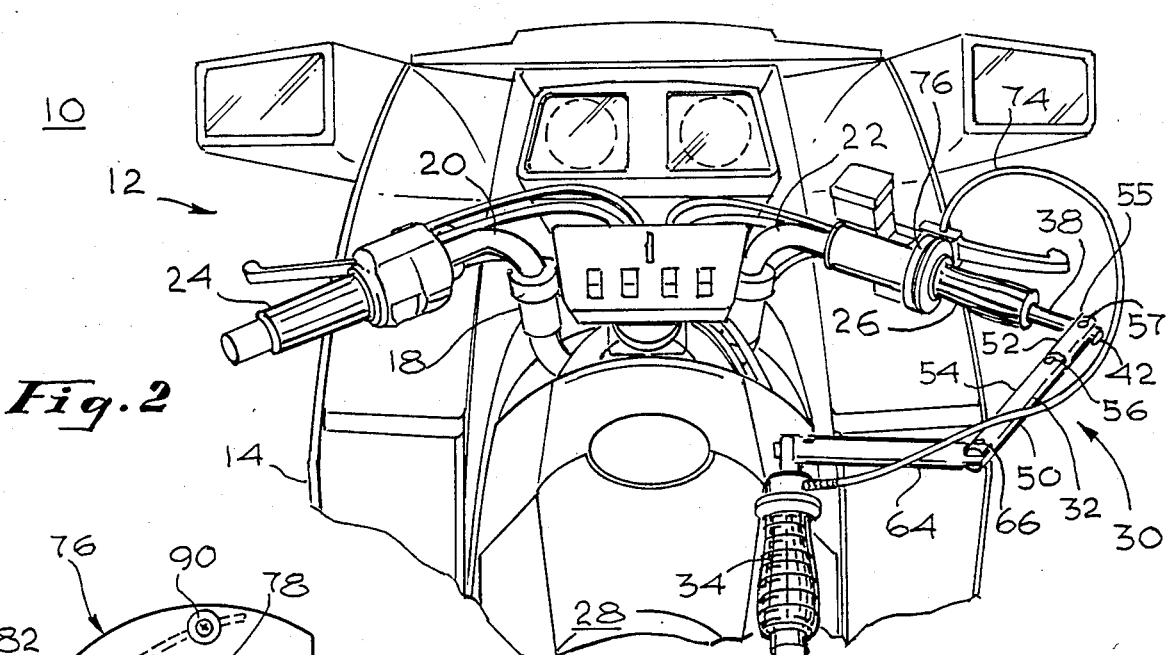
FIG. 2 is an enlarged, schematic, fragmentary perspective view of the auxiliary steering device of the assembly of FIG. 1.
Figure 3:
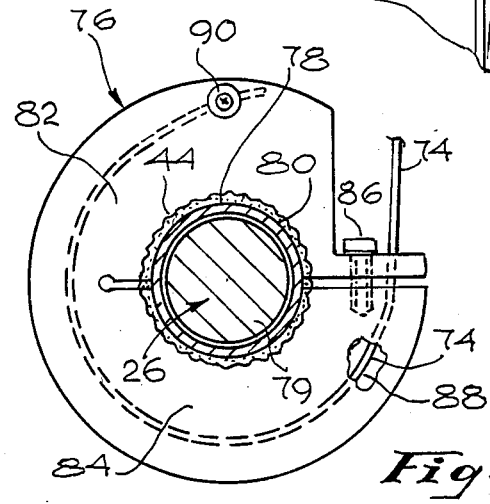
FIG. 3 is an enlarged schematic front elevation, partly in section, of the throttle connector wheel portion of the auxiliary steering device of FIG. 1.

A first preferred embodiment of the improved two-wheeled vehicle assembly of the present invention is schematically depicted in FIGS. 1 and 2. Thus, assembly 10 is shown, which comprises a motorcycle 12 having a frame 14, motor with carburator, throttle and throttle linkage ( not shown ), a pair of wheels 16, one in front of the other, a steering column 18 with a pair of handlebars 20 and 22 bearing, respectively, handles 24 and 26, and a seat 28.

Assembly 10 also includes an auxiliary steering device 30. Device 30 comprises an articulated arm 32 bearing a handle 34 at its rear end. Arm 32 is secured to handle 26 and extends rearwardly and transversely therefrom to a position adjacent seat 28 so that a rider 36 can sit back comfortably in a fully relaxed non-fatiguing position on seat 28 and can hold handle 34 and easily and precisely steer motorcycle 12 without effort.

Figure 4:
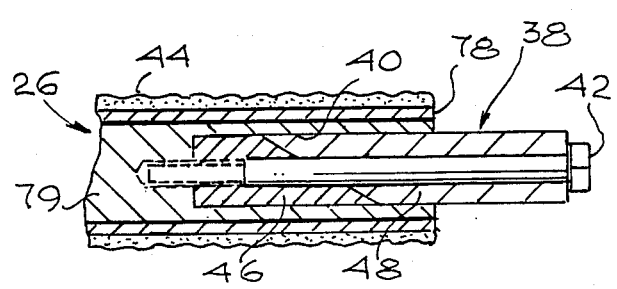
FIG. 4 is an enlarged fragmentary schematic longitudinal cross section of the connection between the auxiliary steering arm and handlebar of the assembly of FIG. 1.

Arm 32 includes a cylindrical front portion 38 which is slideably received in the central space 40 of handle 26 and is held therein by a threaded bolt 42 passing longitudinally therethrough from the rear end thereof and screwed into the front end of handle 26. Handle 26 is shown in FIG. 4 covered by rotatable throttle sleeve 78 and grip 44. If desired, portion 38 can be split into two diagonaled halves 46 and 48 (FIG. 4) so that tightening of bolt 42 into handle 26 has the effect of wedging halves 46 and 48 tightly in handle 26.

Arm 30 further includes a generally transverse articulated portion 50 releasably and adjustably secured to the rear end of portion 38 by bolt 42. Portion 50 may include a first rod 52 through which bolt 42 passes and which is releasably pivotably secured to second transverse rod 54, as by a threaded bolt 56. The end 55 of rod 52 through which bolt 42 passes is split longitudinally and can be releasably clamped down on bolt 42 by vertical bolt 57 passing through end 55. As shown more particularly in FIG. 6, rod 54 may be split longitudinally at its front end 58 and includes a recess 60 within which a tongue 62 of rod 52 is slideably received. Bolt 56 passes down through end 58 and tongue 62 and can be screwed sufficiently tightly to cause the adjacent surfaces of tongue 62 and end 58 to adjustably frictionally engage to control the force necessary to pivot arms 52 and 54 relative to each other.

Rod 54 can be similarly adjustably hinged at its opposite end to a third rod 64 by a threaded pin or bolt 66. Rod 64 extends transversely and is connected to rear handle 34 as shown in FIG. 5. Thus, handle 34 has a front tongue 68 secured to rod 64 by a bolt 70 which can be held in place by a set screw 72 which adjusts the ease of rotation of handle 34 around rod 64.

Arm 32 is fully adjustable, extending rearwardly and generally transversely from handle 26 to any desired position near seat 28. Rider 36 grips handle 34 and maneuvers motorcycle 12 easily by moving handle 34 in the desired direction, the direction being transmitted to handlebar 22. The segments of arm 32 can be tightened so that they hold their relative positions but can be pushed away when the rider 36 wishes to dismount or during an emergency. Thus, arm 32 permits motorcycle 12 to be steered with improved ease and less effort.

Arm 32 preferably also includes a throttle extension means in the form of a guide wire 74 which is secured to the side of handle 34 and which runs forward to a wheel 76 secured to and extending outwardly from rotatable throttle sleeve 78 disposed over the core (stationary) 79 of handle 26, and to which grip 44 is connected for rotation therewith. Thus, grip 44 and sleeve 78 rotate together over fixed core 79. Wheel 76 has a central opening 80 therein which receives sleeve 78 and wheel 76 is split partway through longitudinally to provide segments 82 and 84 which are adjustably clamped together by screw 86 in order to adjustably tighten around and secure them to sleeve 78. Thus, wheel 76 moves with sleeve 78. Wheel 76 has a peripheral groove 88 therein in which the front end of wire 74 is releasably pinned, as by screw 90. Sleeve 78 connects to the carburator throttle linkage (not shown) so the rotation of sleeve 78 causes advancing or retracting of the throttle to control the speed of the motor (not shown).

Handle 34 includes a core 92 to which tongue 68 is attached, a sleeve 93 and a grip 94, both of which surround core 92. Sleeve 93 and grip 94 rotate together relative to stationary core 92 in order to control the position of the throttle. Thus, an O-ring 96 is disposed between core 92 and sleeve 93 to provide sufficient resistance so that sleeve 93 will hold its rotated position and, consequently, the throttle position will be held, until grip 94 is forcibly turned by rider 36.

It will be understood that, if desired, another type of throttle position retention member could be used in place of that described above.

Rotation of grip 94 causes wire 74 to advance or retract, in turn causing it to rotate both wheel 76 and throttle sleeve 76 connected thereto, thereby operating the speed of the motor. Thus, both vehicle steering and vehicle speed can be easily and conveniently regulated through handle 34 while rider 36 sits fully back on seat 28 with both hands off of handles 24 and 26 and assumes a quiet resting position which successfully fights fatigue.

Assembly 10 is simple, durable, efficient and inexpensive, providing improved vehicle handling. Moreover, it can be easily installed on and removed from a motorcycle or the like without complicated equipment.

FIG. 7

A second preferred embodiment of the improved two-wheeled vehicle assembly of the present invention is schematically depicted in FIG. 7. Thus, assembly 10a is shown. Components thereof which are similar to those of assembly 10 bear the same numerals but are succeeded by the letter "a". Assembly 10a is sustantially identical to assembly 10 except that auxiliary steering device 30a differs from device 30 in certain respects.

Thus, assembly 10a includes motorcycle 12a, frame 14a, a pair of wheels (not shown), steering column 18a, handlebars 20a and 22a, handles 24a and 26a, a seat (not shown) and device 30a.

Device 30a comprises a single elongated blade 100 pivotally secured in a slot 102 in a fixture 104 secured to and extending rearwardly from handlebar 22a. Blade 100 can pivot sideways to a position close to and above the rider's seat. It terminates rearwardly in handle 34a similar to handle 34 and bearing wire 74a secured to rotatable grip 94a. Wire 74a runs to wheel 76a secured to handle 26a and operable to regulate the throttle in the manner previously described for wheel 76. Thus, device 30a performs similarly to device 30.

FIG. 8

Now referring more particularly to FIG. 8, a third preferred embodiment of the improved two-wheeled vehicle assembly of the present invention is schematically depicted therein. Thus assembly 10b is shown. Components thereof which are similar to those of assembly 10 or 10a bear the same numerals but are succeeded by the letter "b".

Assembly 10b is identical to assembly 10 except that wire 74b runs from grip 94b of handle 34b directly forward and into the carburator throttle linkage (not shown) rather than being connencted to handle 26b. Such throttle linkage, throttle and motor are located below gasoline tank 110 of motorcycle 12b. Wire 74b is made long enough to accommodate any desired movement of arm 32b, including repositioning to rods 52b, 54b and 64b. It will be understood that assembly 10b includes frame 14b bearing a pair of wheels (not shown), steering column 18b, handlebars 20b and 22b, a seat (not shown) and device 30b. Assembly 10b has sustantially the advantages of assembly 10.

Various other modifications, alterations, changes and additions can be made in the improved vehicle assembly of the present invention, its components and their parameters. All such modifications, changes, alterations and additions as are within the scope of the appended claims form part of the present invention.

What is claimed is:

1. An improved two-wheeled motor vehicle assembly, said assembly comprising, in combination:

a. a two-wheeled motor vehicle having a frame and a pair of wheels, one in front and one in the rear, a steering column, including a pair of handlebars, with a pair of handles, a seat and a motor with carburator, throttle and throttle linkage, and a throttle control connected to one of the handles and to said throttle linkage; and, b. an auxiliary steering device comprising an elongated movable arm connected to at least one of said handlebars and extending rearwardly therefrom to an area adjacent said seat, whereby a rider can sit back in said seat with hands off of said handlebars and accurately steer said vehicle through said auxiliary steering device, said auxiliary steering device also including a throttle control extension means connected to the rear portion of said elongated arm and to said throttle control.

2. The improved vehicle assembly of claim 1 wherein said arm is hinged so as to be adjustable in position relative to said seat.

3. The improved vehicle assembly of claim 2 wherein said arm includes a plurality of articulated portions which facilitate positioning of said arm and permit collapsing of said arm when it is not in use and when an emergency arises.

4. The improved vehicle assembly of claim 3 wherein said arm includes a first portion inserted in and extending rearwardly from the rear end of said one of said handlebars, a generally transversely extending multi-articulated intermediate portion connected to said first arm portion, and a terminal portion connected to and extending rearwardly of said intermediate portion, and wherein the points of connection and articulation in said arm are adjustable to adjust the position of said terminal portion and the degree of force necessary to move said portions relative to each other.

5. The improved vehicle assembly of claim 1 wherein the rear end of said elongated arm includes an auxiliary handle core with a sleeve and grip rotatably mounted thereover, said auxiliary handle grip bearing the rear end of said throttle control extension means.

6. The improved vehicle assembly of claim 5 wherein said throttle control extension means includes a throttle control extension wire connected at its rear end to said auxiliary handle grip and at its front end to said one moveable handlebar handle, and wherein a portion of said moveable handlebar handle is rotatable, whereby rotation of said auxiliary handle grip effects corresponding rotation of said handlebar handle portion to advance or retract said throttle.

7. The improved vehicle assembly of claim 6 wherein said throttle control extension means includes a wheel releasably connected to a throttle sleeve rotatably disposed over said handlebar handle and releasably securing said wire front end therein, whereby rotation of said auxiliary handle grip effects rotation of said throttle sleeve.

8. The improved vehicle assembly of claim 5 wherein said throttle control extension means includes a throttle position retention member.

9. The improved vehicle assembly of claim 8 wherein said throttle position retention member comprises an O-ring disposed around said auxiliary handle core and bearing against the inside of said sleeve to effect selective resistance against rotation thereof.

10. The improved vehicle assembly of claim 1 wherein said vehicle is a motorcycle.

11. The improved vehicle assembly of claim 1 wherein said vehicle is a motorbike.

12. The improved vehicle assembly of claim 1 wherein said throttle control extension means is connected directly to said carburator throttle linkage.

13. The improved vehicle assembly of claim 12 wherein said throttle control extension means comprises a wire.

14. An improved two-wheeled motor vehicle assembly, said assembly comprising, in combination:

a. a two-wheeled motor vehicle having a frame and a pair of wheels, one in front and one in the rear, a steering column, including a pair of handlebars, with a pair of handles, a seat and a motor with carburator, throttle and throttle linkage, and a throttle control connected to one of the handles and to said throttle linkage; and, b. an auxiliary steering device comprising an elongated movable arm connected to at least one of said handlebars and extending rearwardly therefrom to an area adjacent said seat, whereby a rider can sit back in said seat with hands off of said handlebars and accurately steer said vehicle through said auxiliary steering device, said arm being hinged so as to be adjustable in position relative to said seat, said arm including a plurality of articulated portions which facilitate positioning of said arm and permit collapsing of said arm when it is not in use and when an emergency arises, said arm specifically including a first portion inserted in and extending rearwardly from the rear end of said one of said handlebars, a generally transversely extending multi-articulated intermediate portion connected to said first arm portion, and a terminal portion connected to and extending rearwardly of said intermediate portion, the points of connection and articulation in said arm being adjustable to adjust the position of said terminal portion and the degree of force necessary to move said portions relative to each other.

* * * * *